United States Patent [19]

Towler et al.

[11] Patent Number: 5,397,556
[45] Date of Patent: Mar. 14, 1995

[54] PROCESS FOR RECOVERY OF SULFUR FROM ACID GASES

[75] Inventors: Gavin P. Towler, Kirkbymoorside, England; Scott Lynn, Pleasant Hill, Calif.

[73] Assignee: The Regents of the Unviversity of California, Berkeley, Calif.

[21] Appl. No.: 991,163

[22] Filed: Dec. 16, 1992

[51] Int. Cl.$^6$ .............................................. C01B 17/16
[52] U.S. Cl. .................. 423/220; 423/244.01; 423/244.1; 423/573.1; 423/230
[58] Field of Search ............ 423/220, 228, 232, 242.2, 423/242.7, 243.01, 244.01, 244.1, 573.1, 230

[56] References Cited

U.S. PATENT DOCUMENTS

| | | | |
|---|---|---|---|
| 3,790,366 | 2/1974 | Bryk et al. | 75/23 |
| 3,856,925 | 12/1974 | Kodera et al. | 423/416 |
| 3,948,639 | 4/1976 | Nermes et al. | 75/9 |
| 4,036,943 | 7/1977 | Huron et al. | 423/576 |
| 4,039,613 | 8/1977 | Kotera et al. | 423/571 |
| 4,293,531 | 10/1981 | Field et al. | 423/232 |
| 4,302,434 | 12/1981 | Hellmer et al. | 423/573 |
| 4,324,776 | 4/1982 | Kim | 423/550 |
| 4,363,790 | 12/1982 | Anderson et al. | 423/230 |
| 4,461,754 | 7/1984 | Diaz | 423/573 |
| 4,481,181 | 11/1984 | Norman | 423/573 |
| 4,666,695 | 5/1987 | Baur et al. | 423/571 |
| 4,795,620 | 1/1989 | Heisel et al. | 423/243 |
| 4,826,664 | 5/1989 | Kay et al. | 423/21.1 |
| 4,999,178 | 3/1991 | Bowman | 423/571 |
| 5,096,683 | 3/1992 | Kriebel et al. | 423/248 |

FOREIGN PATENT DOCUMENTS

| | | | |
|---|---|---|---|
| 7321190 | 12/1973 | France | C01B 17/06 |
| 2103645 | 2/1983 | United Kingdom | 423/228 |

OTHER PUBLICATIONS

Fukuda, K., et al., "Catalytic Decomposition of Hydrogen Sulfide", *Ind. Eng. Chem, Fundam.*, vol. 17, No. 4, 1978.

*Primary Examiner*—Gary P. Straub
*Assistant Examiner*—Timothy C. Vanoy
*Attorney, Agent, or Firm*—Townsend and Townsend Khourie and Crew

[57] ABSTRACT

Elemental sulfur is recovered from the $H_2S$ present in gases derived from fossil fuels by heating the $H_2S$ with $CO_2$ in a high-temperature reactor in the presence of a catalyst selected as one which enhances the thermal dissociation of $H_2S$ to $H_2$ and $S_2$. The equilibrium of the thermal decomposition of $H_2S$ is shifted by the equilibration of the water-gas-shift reaction so as to favor elemental sulfur formation. The primary products of the overall reaction are $S_2$, CO, $H_2$ and $H_2O$. Small amounts of COS, $SO_2$ and $CS_2$ may also form. Rapid quenching of the reaction mixture results in a substantial increase in the efficiency of the conversion of $H_2S$ to elemental sulfur. Plant economy is further advanced by treating the product gases to remove byproduct carbonyl sulfide by hydrolysis, which converts the COS back to $CO_2$ and $H_2S$. Unreacted $CO_2$ and $H_2S$ are removed from the product gas and recycled to the reactor, leaving a gas consisting chiefly of $H_2$ and CO, which has value either as a fuel or as a chemical feedstock and recovers the hydrogen value from the $H_2S$.

19 Claims, 2 Drawing Sheets

PROCESS FOR RECOVERY OF SULFUR FROM ACID GASES

This invention lies in the general field of methods of treating natural gas and other gases containing hydrogen sulfide for purposes of removing the hydrogen sulfide from these gases and converting the sulfur content of the hydrogen sulfide to elemental sulfur,

BACKGROUND OF THE INVENTION

At least 25% of the natural gas produced in the United States has an $H_2S$ content of greater than 4 parts per million and is therefore classified as "sour." The $H_2S$ is an environmental hazard, rendering the gas unacceptable for transport or use. The problem of $H_2S$ gas arises from fossil fuels in general, such as petroleum, coal and lignite. The sulfur present in these materials is converted to $H_2S$ by hydrogenation when these materials are converted to gaseous fuels such as refinery gas, coal gas and blue-water gas. Here as well, the sulfur value of the $H_2S$ is lost unless the $H_2S$ is converted to elemental sulfur, and use of the fuels without complete removal of the $H_2S$ raises a risk of hazardous emissions. For these reasons, plus the value of sulfur itself, the treatment of these gases to remove the $H_2S$ and convert it to elemental sulfur is of major importance to the chemical and energy industries.

The process commonly used at present for conversion of $H_2S$ recovered from gases of this type to elemental sulfur is the Claus process. This process raises concerns relating to sulfur oxide emissions, however, since the process involves the formation of $SO_2$ by oxidation of $H_2S$ in air as an intermediate toward the production of elemental sulfur. Treatment of the tail gas from this process to eliminate the $SO_2$ raises the cost of the process significantly. A further disadvantage of the process is the loss of the potential fuel value of the hydrogen content of the gas, since hydrogen is converted in the Claus process to water.

A process proposed by Bowman, U.S. Pat. No. 4,999,178, issued Mar. 12, 1991, claimed an alternative method of recovering sulfur from $H_2S$ using the reaction between $H_2S$ and $CO_2$ instead of $H_2S$ and $SO_2$. Bowman taught that this reaction was:

$$CO_2 + H_2S \rightleftharpoons CO + H_2O + \tfrac{1}{2} S_2 \quad (1)$$

The sulfur produced by this reaction is recovered by condensation, and the carbon monoxide is reacted with water vapor to produce hydrogen gas and carbon dioxide:

$$CO + H_2O \rightleftharpoons CO_2 + H_2 \quad (2)$$

This effects oxidation of the $H_2S$ to elemental sulfur without requiring the use of air as an oxidant.

SUMMARY OF THE INVENTION

The present invention arises in part from the discovery that reaction (1) is not the mechanism by which elemental sulfur is formed, according to experimental investigations into the behavior of mixtures of $CO_2$ and $H_2S$ at high temperatures. Elemental sulfur is formed instead by thermal decomposition of hydrogen sulfide:

$$H_2S \rightleftharpoons H_2 + \tfrac{1}{2} S_2 \quad (3)$$

The hydrogen thus formed may then react with carbon dioxide via the water-gas-shift reaction (2), causing the equilibrium of reaction (3) to be shifted in favor of elemental sulfur formation. Reaction (3) proceeds at a much lower rate than reaction (2), which reaches equilibrium essentially instantaneously at temperatures in excess of about 600° C.; therefore reaction (3) is the rate-limiting step. Knowledge of the rate-limiting step allows several improvements to be made beyond the technology taught by Bowman.

Firstly, it is possible to increase the rate of reaction by performing the reaction in the presence of a catalyst that accelerates reaction (3). This allows a considerable reduction in the volume required for the reaction vessel and thereby reduces process costs and increases process efficiency.

Secondly, excessive formation of byproducts can be prevented by rapidly cooling the reaction gases. The two main byproducts are COS and $SO_2$, formed by the reactions:

$$CO + \tfrac{1}{2} S_2 \rightleftharpoons COS \quad (4)$$

$$H_2S + CO_2 \rightleftharpoons COS + H_2O \quad (5)$$

$$2 H_2O + 3/2 S_2 \rightleftharpoons 2 H_2S + SO_2 \quad (6)$$

As a result, a high rate of conversion of $H_2S$ to elemental sulfur with minimal formation of COS and $SO_2$ is achieved by performing the conversion of $H_2S$ at high temperature in the presence of both $CO_2$ and a catalyst which enhances the rate of reaction (3), followed by rapid quenching to prevent reactions (4), (5) and (6) from reaching equilibrium during the quench. The rate of quenching is preferably at least about 100° C./s, more preferably at least about 500° C./s, and most preferably about 100° C./s or higher.

For conversion by this process, $H_2S$ and $CO_2$ are extracted from a feed gas in the desired proportions by absorption with an appropriately selected solvent followed by stripping the $H_2S$ and $CO_2$ from the solvent. For feed gases containing excess $CO_2$, the appropriate solvent is one in which the rate at which $H_2S$ dissolves exceeds the rate at which $CO_2$ dissolves.

Absorption and stripping may also be performed on the product stream after quenching following its emergence from the $H_2S$ conversion reactor, to extract unreacted $H_2S$ and $CO_2$ for recycling to the reactor. The solvent used on the product stream may be the same as the solvent used on the feed gas, in which case the same stripper may be used for both absorbers. Alternatively, however, a second absorber and stripper may be used, in which case the two absorber/stripper loops are isolated from one another and a different solvent may be used in each. In this case, the recycle will by-pass the first absorber and stripper.

In either case, however, solvents of this type are subject to degradation upon contact with the small amounts of COS and $SO_2$ which may have been formed in the reaction and are present in the product stream. A further discovery in accordance with this invention is that degradation of this type can be avoided by passing the gaseous product mixture through a hydrolysis unit to convert the COS to $CO_2$ and $H_2S$ by reaction (7):

$$\{COS\}_{soln} + H_2O \rightleftharpoons \{CO_2\}_{soln} + \{H_2S\}_{soln} \quad (7)$$

where "soln" denotes that the species is in solution. Preferred hydrolysis units are those in which the gas stream is placed in contact with an aqueous solution of a solute which serves both as a catalyst for reaction (7) and as a reactant which combines with any $SO_2$ present. The $CO_2$ and $H_2S$ resulting from the hydrolysis is then stripped from the aqueous solution and recycled back to the $H_2S$ conversion reactor.

Further features, objects and advantages of the invention will become apparent from the description which follows.

DETAILED DESCRIPTION OF THE INVENTION AND PREFERRED EMBODIMENTS

Figure 1:
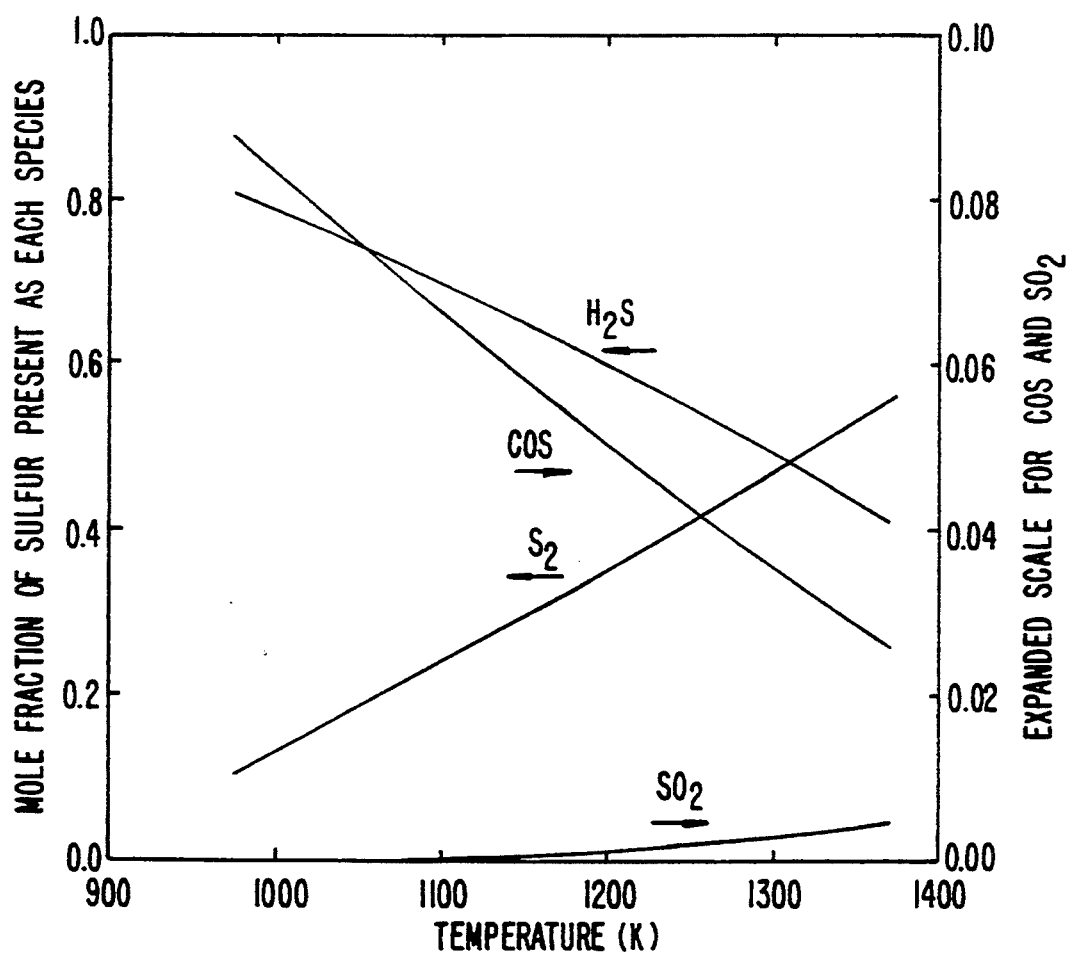
FIG. 1 is a graphical representation of sulfur distribution among the various sulfur-containing compounds vs. temperature for a typical feed composition.

An understanding of the invention and its preferred embodiments is readily obtained by examination of the flow diagram in the attached Figure. Prior to discussion of the flow diagram, however, key features of the invention will be described in detail.

The catalyst used in the conversion of $H_2S$ to elemental sulfur in the presence of $CO_2$ is one which will increase the reaction rate of the decomposition of $H_2S$ to $H_2$ and $S_2$ according to reaction (3). For best results, the catalyst should also be one which is thermally stable without being susceptible to a phase change to any significant degree, or to decrepitation or a reduction in surface area. Of the wide range of catalysts meeting this description, a preferred group are transition metal sulfides. Preferred among transition metal sulfides are sulfides of molybdenum, chromium, tungsten, and vanadium, notably $MoS_2$, $Cr_2S_3$, $WS_2$ and $V_2S_3$. Particularly preferred are $MoS_2$, $Cr_2S_3$ and $WS_2$, with $MoS_2$ the most preferred.

The reaction is conducted in the gas phase over a solid catalyst, but the form of the catalyst is otherwise not critical and may vary widely. As indicated above, the preferred form of the catalyst is one which is stable against any substantial physical change under the high-temperature conditions at which the reaction is conducted. The catalyst may be designed for fixed-bed or fluidized-bed reactors, and may assume the form of a powder, granules, pellets, particles in general of various sizes, or a coating on an inert support such as silica or ceramic particles or conventional reactor tube packings of either regular or irregular shape. In the preferred practice of the invention, the catalyst is in the form of a fixed bed, and consists of an inert, porous solid support impregnated with the transition metal sulfide. Catalysts fabricated in this manner are commercially available, and, alternatively, methods of preparing them are known to those skilled in the art. Solid catalyst parameters such as the surface area of the catalyst, its pore volume, the particle size and its bulk density may be varied to optimize the conversion, such optimization also being within the purview of those skilled in the art. In the preferred practice of the invention, the reaction gas mixture flows through one or a series of robes packed with the catalyst, and heated externally.

The reaction is conducted at an elevated temperature sufficiently high to achieve rapid equilibration of $CO_2$ and $H_2$ with $CO$ and $H_2O$ according to reaction (2). This temperature is at least about 700° C., and preferably at least about 800° C. There is no absolute upper limit on the reaction temperature, and conversion to elemental sulfur generally improves as the temperature increases. Practical considerations, however, will often impose upper limits. Among these considerations are the increased tendency toward corrosivity of the already corrosive gas mixture as the temperature is increased, and the availability of materials of construction for the reactor tubes which can withstand both high temperature and a corrosive atmosphere. Increasing the reactor temperature above 1,000° C. also promotes the formation of significant amounts of byproduct $SO_2$, which is not desired. Considering this, and the materials currently available, the upper limit for practical, economical operation is about 950° C.

High-temperature, corrosion-resistant materials are generally needed for the reactor tubes. Examples of such materials are wrought cobalt-base alloys such as Haynes alloys #25 and #188, nickel-base superalloys such as HR 160, modified steels such as RA 85H, Haynes #556 and Incoloy 801, and zirconia.

The pressure at which the reaction is conducted is not critical and may vary. Due to the increase in the number of moles, however, the progress of the reaction toward elemental sulfur is favored by low pressures. Accordingly, the reaction is preferably conducted at approximately atmospheric pressure or below.

The residence time, and hence the reactor size, are preferably minimized for purposes of minimizing the amount of high-cost materials required for the construction of the reactor tubes and minimizing the construction costs of the reactor in general. As indicated above, selection of the optimal catalyst material in the optimal physical form will permit effective results to be obtained with a low residence time. The residence time required will depend on the temperature of the reactor, the composition of the feed gas and the loading of active agent on the catalyst. Experiments for particular catalysts under particular conditions have been reported in the literature. See, for example, Fukuda, K., et al., *Ind. Eng. Chem. Fundam.* 17(4):243-248 (1978), who discuss the behavior of molybdenum disulfide catalyst. These data may be used, together with information on such parameters as the catalyst loading, surface area and porosity to calculate the residence time required. This is a practice well understood by those skilled in the art. An example of the beneficial effects of catalysis is given below.

Upon completion of the $H_2S$-conversion reaction, the resulting product gas mixture contains $H_2S$, $CO_2$, $CO$, $H_2$, $H_2O$, $S_2$ and smaller amounts of $COS$, $SO_2$ and $CS_2$. This mixture is quenched by rapid cooling to prevent or minimize loss of elemental sulfur product, which can occur by conversion to carbonyl sulfide according to reaction (4), hydrolysis to $H_2S$ and $SO_2$ according to reaction (6), back reaction to $H_2S$ according to reaction (3) in reverse, or conversion to carbon disulfide. Of primary concern is reaction (4) since carbonyl sulfide is generally the by-product formed in highest concentration.

FIG. 1 shows the effect of allowing the gas to re-equilibrate on cooling, for a feed stream containing 50% $H_2S$ in $CO_2$ at 1 atm pressure. The plot in this figure illustrates that as the temperature is decreased, elemental sulfur is lost and $H_2S$ and byproduct $COS$ are formed. This can be prevented by removing the gas from contact with the catalyst and cooling the gas rapidly to a temperature at which the sulfur-consuming reactions are slow compared with processing timescales.

The temperature to which the product mixture should be cooled for the most effective and economically efficient results in regard to the process as a whole will vary depending on such factors as the flow velocity of the gas and the spatial arrangement of the process equipment. As an example, however, it has been found experimentally that for gas velocities faster than 1 meter per second, cooling to a temperature of 650° C. will provide satisfactory results. The quench rate may also vary; the rate should be at least 10 about 100 degrees-centigrade-per-second, but best results are generally achieved at rates of about 1000 degrees-centigrade-per-second or greater.

The method of quenching is not critical, and any of various methods known to those skilled in the art may be used. One example is the use of a shell-and-tube water-cooled heat exchanger analogous to those used in ethane-cracking plants. In a heat exchanger of this type, the product gases pass through heat exchange tubes surrounded by pressurized water, the heat from the gases converting the water to pressurized steam. Another example is the injection of water as a spray into the gas stream, which cools upon vaporizing the water droplets. The mount of water to be injected is readily determined by the desired quench temperature and the gas flow rate in accordance with relations well known to those skilled in the art. A third example is the heat exchange of the product gases with cold feed gas prior to entry of the feed gas into the conversion reactor. Whether adequate quenching can be achieved in this manner depends on the temperature and quantity of the feed gas, the capacity of downstream units for handling by-product COS, and other factors of overall system design.

Of these three examples, the use of a shell-and-tube heat exchanger offers the advantage of providing high pressure steam which can be used as a heat source elsewhere in the process. A heat exchanger of this type also avoids the addition of water to the process gas, which might increase the formation of by-product $SO_2$ by reaction (6). While the latter can be compensated for in other parts of the overall plant scheme, the optimum quench method among these and other methods will be determined at least in pan by economic considerations.

In practical operation, a small amount of by-product is formed, and the major constituent is generally carbonyl sulfide. In the preferred practice of the present invention, as indicated above, the carbonyl sulfide produced in the $H_2S$ conversion reactor is hydrolyzed in accordance with reaction (7), after removal of the elemental sulfur which has condensed during the quenching of the $H_2S$ conversion product gases. Reaction (7) may be effected by contact of the remaining gas mixture with a hot basic solution. An example of such a solution is an aqueous solution of an alkanolamine such as monoethanolamine, diethanolamine, and methyldiethanolamine. Another example, and one which is preferred in the practice of the present invention, is an aqueous solution of an alkali metal carbonate such as potassium carbonate. In either case, the concentration of the base in the aqueous solution is not critical and may vary. Effective results are generally achieved at concentrations of from about 10% to about 30% by weight.

The use of potassium carbonate offers the further advantage of reacting with any $SO_2$ present in the product stream, to form potassium sulfite ($K_2SO_3$), potassium thiosulfate ($K_2S_2O_3$) and other sulfoxy salts, thereby removing the $SO_2$ from the system. For systems in which the level of $SO_2$ is minimized by the rapid quench, and judicious selection of reactor temperature, the solution can be used without replenishment of potassium carbonate for an extended period of time. An alternative method for removing $SO_2$, which prolongs the useful life of the potassium carbonate solution, is to contact the reactor product gas with a stream of liquid water. This causes a reaction between $H_2S$ and $SO_2$ in solution, forming a mixture known as Wackenroder's Liquid, which is well known to those skilled in the art. This solution may be periodically disposed of (by injection upstream of the sulfur condenser of the present process, for example, or by injection into the reactor of a sulfuric acid plant, or by various other means which will readily occur to those skilled in the art) and replaced with fresh water.

The use of an elevated temperature in the hydrolyzer increases the rate of absorption, desorption and hydrolysis. While the actual temperature is not critical, best results are most often achieved with temperatures in the range of about 60° C. to about 95° C.

As mentioned above, there is at least one point, and often two points, in process flow schemes which embody the concepts of the present invention where a solvent is used to absorb $H_2S$ and $CO_2$ from as gas stream such as the feed gas or the product gas from the conversion reactor. Such solvents may be selected from a wide range of materials. Preferred are aqueous solutions of alkanolamines, dialkanolamines, and alkali metal carbonates. Preferred among the alkanolamines and dialkanolamines are ($C_1$-$C_4$ alkanol)-amines and di-($C_1$-$C_4$ alkanol)-amines, examples of which are ethanolamine, cliethanolamine, propanolamine and isopropanolamine. Preferred among the alkali metal carbonates is potassium carbonate. When such solvents are used at two locations in the flow scheme, such as for example on the feed stream and on the product stream after hydrolysis of carbonyl sulfide, the same solvent may be used at each location, or a different solvent at each location. The choice will depend on any differences between the composition of the two streams, and on economic considerations in general.

Figure 2:
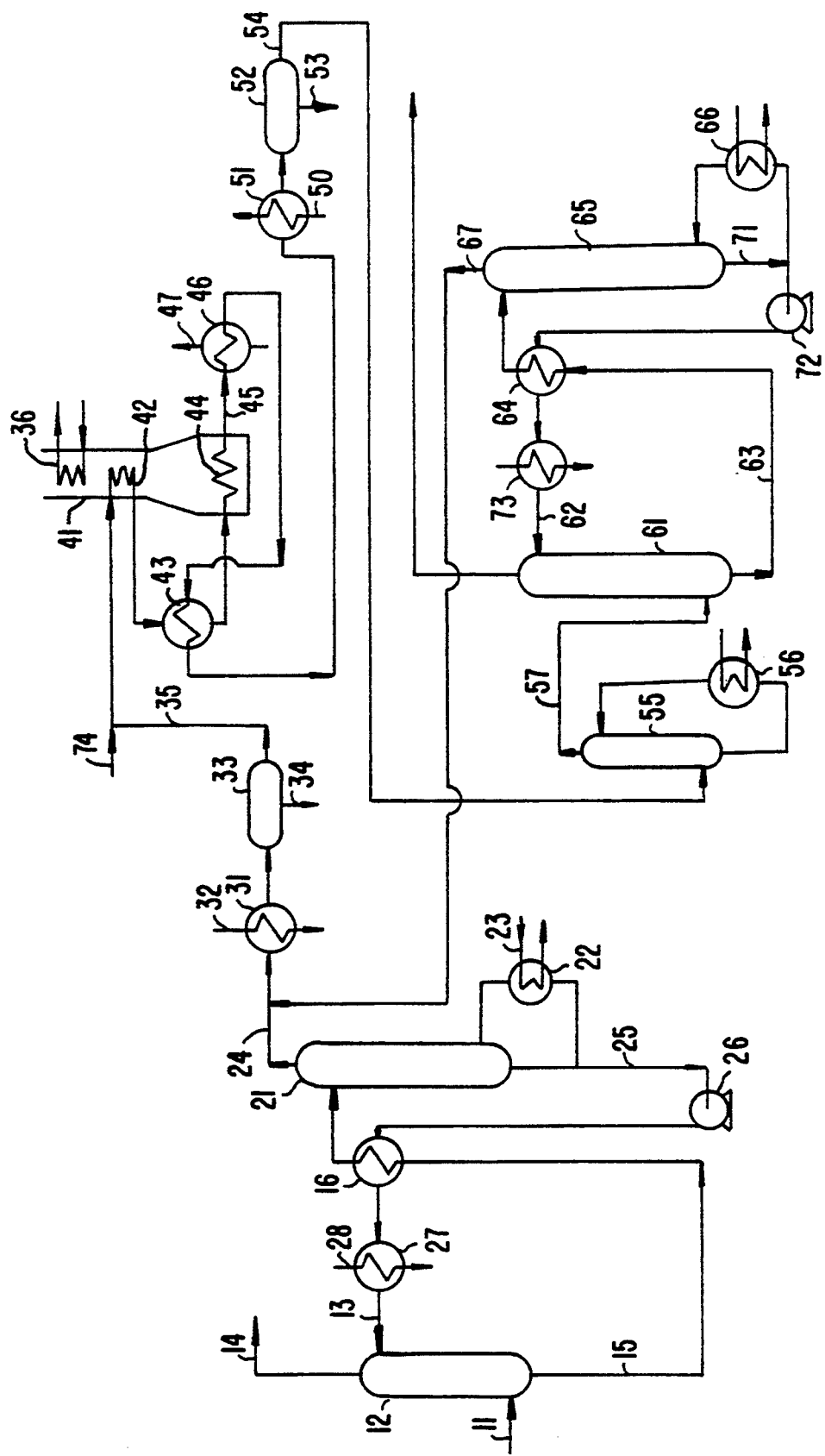
FIG. 2 is a plant flow diagram illustrating an application of the present invention.

FIG. 2 depicts a flow diagram representing one example of a plant scheme embodying the concepts of the present invention. This plant scheme is offered for illustrative purposes only, and is not intended to limit or define the scope of the invention in any manner.

The feed to this system is a sour gas 11 which contains $H_2S$ and $CO_2$, with the $CO_2$ at a level approximately the same as that of the $H_2S$ on a mole basis. The sour gas enters an absorber 12, where the gas travels upward while contacting a liquid solvent which enters from a solvent feed line 13 and flows downward. The liquid solvent is of the type described above which, although dissolving both $H_2S$ and $CO_2$, has a greater solvent power for $H_2S$ than for $CO_2$. The absorber 12 is of conventional construction, and is provided with trays, packing or both to provide the maximum contact between an upwardly flowing gas and a downwardly flowing liquid. Sweetened ($H_2S$-depleted) gas leaves the absorber 12 through a vent line 14. This gas contains only a few parts per million or less of $H_2S$, and is useful as a fuel, as a chemical feedstock or for a variety of purposes, depending on its composition.

The solvent, with the absorbed $H_2S$ and $CO_2$, leaves the absorber 12 through line 15. The solution is then heated in a heat exchanger 16 and directed to a stripper 21, where the $H_2S$ and $CO_2$ are extracted from the solution as vapors. The stripper 21 is provided with a reboiler 22 which uses steam 23 as a source of heat. The gas stream 24 leaving the stripper 21 thus contains $H_2S$, $CO_2$ and water vapor. The liquid stream 25 leaving the stripper contains the solvent depleted of $H_2S$ and $CO_2$. By way of a liquid pump 26, the depleted solvent 25 is directed through the heat exchanger 16 which heats the solvent entering the stripper, and is further cooled in a second heat exchanger 27 which uses water 28 as a coolant.

The gas stream 24 leaving the stripper is cooled in a heat exchanger 31 by water 32. The stream is then passed through a phase separator 33 operated at approximately 20° C. to 50° C., where condensed water 34 is removed. The condensed water 34 may then be recycled to the solvent loops feeding the absorber 12 and stripper 21, as well as other absorbers and strippers at other locations in the flow scheme, discussed below, to maintain the composition of the solvent which, as indicated above, is an aqueous solution the appropriate dilution of which may need to be restored at various points in the process.

The gas stream 35 leaving the separator 33 consists of $H_2S$ and $CO_2$ saturated with water vapor at the temperature of the separator. The composition of this gas stream is determined by economic considerations, and depends in part upon the cost of the furnace materials and in part upon the cost of the steam used as heat source in the stripper reboilers. A typical composition would be between 50 and 80 mole % $H_2S$ in $CO_2$ on a dry basis, with 69 mole % $H_2S$ in $CO_2$ giving an approximate optimum value. The stream then enters a furnace 41 where it is preheated in heat-exchange tubes 42 in the furnace exhaust. In these tubes, the gas is heated to approximately 200° C. The preheated gas is then passed to a further heat exchanger 43 where it is heated by process gases leaving a high-temperature reactor 44 located inside the furnace. The preheated gas then passes directly into the high-temperature reactor 44, where conversion of the $H_2S$ to elemental sulfur takes place according to reaction (3), together with reactions (2), (4), (5) and (6) in the presence of the catalyst and at the temperature conditions described above.

The furnace 41 is of conventional construction, and is fired by a suitable fuel burning in air. Waste heat generated in the furnace is recovered by passing the furnace flue gases over boiler tubes 36 fed with boiler feed water. These tubes may be used either to produce steam for the any of the various steam-heated reboilers in the flow scheme, or to produce preheated boiler feed water for any of the various waste heat boilers (water-cooled heat exchangers). The steam may also be used elsewhere in the process or in processes conducted in nearby plants.

The product gas 45 leaving the high-temperature reactor 44 consists chiefly of $CO_2$, $H_2S$, sulfur vapor, water vapor, CO, $H_2$ and by-product COS. As indicated above, small amounts of sulfur dioxide may also be present, depending on the reactor temperature. The product gas 45 is immediately passed into a quencher 46, in accordance with any of the examples of quenching methods listed above. In the flow diagram shown in the Figure, the quencher is a waste heat boiler which produces high-pressure steam 47, which may be used as a heat source elsewhere in the process or in other processes at the same location. The temperature of the product gas leaving the quencher 46 is about 600° C. or less.

Upon leaving the quencher 46 and the heat exchanger 43, the product gas is further cooled in a waste-heat boiler 51 which uses boiling water 50 as a coolant. In the boiler, the gas is cooled to a temperature in the range of about 120° C. to about 150° C., which results in condensation of the sulfur. The condensed sulfur is separated from the stream in a separator 52 as liquid sulfur 53, which is useful for storage and sale.

The gas stream 54 remaining after removal of the sulfur then enters a hydrolyzer 55 to convert the COS in the gas stream to $H_2S$ and $CO_2$. The hydrolyzer is a column in which the upwardly flowing gas stream is contacted with a circulating solution as described above. A cooler 56, using cooling water as coolant, maintains the temperature in the hydrolyzer at the desired level.

Upon leaving the hydrolyzer, the hydrolysis product stream 57 is cooled, preferably to a temperature within the range of about 10° C. to about 30° C., and is then passed to a second absorber 61, which is a vessel of design and purpose similar to that of the first absorber 12. The cooling, although not shown in the Figure, may be achieved in any conventional manner. One convenient method would be the addition of an extra section to the top of the hydrolyzer column, the extra section including a recirculating stream of cold water. The cold water also causes condensation of a portion of the water vapor present in the gas. Condensed water thus obtained can be used in the same manner as the condensed water 34 retrieved from the first separator 33, to reinforce the water content of the aqueous solutions used at various points in the process.

In the second absorber, the cooled gas stream contacts a solvent 62 which, as indicated above, may be the same type of solvent used in the first absorber 12, and which absorbs $H_2S$ and $CO_2$. The solution thus formed 63 is heated in a heat exchanger 64, then passed to a second stripper 65 where, with the help of a reboiler 66, the $H_2S$ and $CO_2$ in the stream are removed together with water vapor from the solution. This gas stream 67 is then combined with the gas stream 24 leaving the first stripper, for recycle to the high-temperature reactor 44. The regenerated solvent 71 leaving the second stripper is directed by a pump 72 to the heat exchanger 64 where it is cooled, and then to a further water-cooled heat exchanger 73, whereupon it enters the second absorber 61.

In the event that insufficient $CO_2$ is present in the sour gas feed 11 to achieve the desired mixture with $H_2S$ in the high-temperature reactor 44, or in the event that the first absorber 12 is operated in a manner which does not dissolve sufficient $CO_2$ from the sour gas to achieve the desired ratio, supplementary $CO_2$ may be added at a supplementary introduction point 74. In the preferred operation of the system, the mole ratio of $H_2S$ to $CO_2$ in the gas stream entering the high temperature reactor 44 is from about 0.25:1 to about 4:1, more preferably from about 1:1 to about 4:1, and most preferably from about 1.5:1 to about 4:1.

The following example is offered for illustrative purposes only, and is intended neither to limit nor to define the invention in any manner.

EXAMPLE

Experiments were carried out in a quartz reactor. A gas containing 5 mole % $H_2S$ in $CO_2$ was passed through a heated section of the reactor packed with quartz wool, and was then withdrawn and cooled quickly. The composition of the gas leaving the reactor was determined by gas chromatography. Experiments were performed with pure quartz wool as packing, and with quartz wool that had been impregnated with molybdenum disulfide catalyst. The catalyst loading achieved by this method was 2.91 g of $MoS_2$ per g of quartz wool and the total amount of catalyst present in the reactor was 4.853 g.

The table below shows the conversion of $H_2S$ obtained in experiments with and without catalyst, and also the conversion that would be obtained at chemical equilibrium at approximately the same temperature. The gas experienced a range of temperatures in the reactor due to the furnace temperature profile. The residence time given is therefore the time for which the gas temperature was greater than 650° C. The temperature given is the approximate greatest temperature experienced by the gas. The error in the conversions is $\pm 2\%$.

| Conversion of $H_2S$ With and Without $MoS_2$ Catalyst | | | | |
| --- | --- | --- | --- | --- |
| Temperature (°C.) | 800 | 850 | 850 | 900 |
| Residence time (s) | 16.5 | 16.6 | 6.7 | 6.8 |
| Experiments with guartz wool, but no catalyst: | | | | |
| Conversion (%) | 28.1 | 32.5 | 28.9 | 34.4 |
| | | | | 36.3 |
| Experiments with guartz wool loaded with $MoS_2$: | | | | |
| Conversion (%) | 76.8 | 83.4 | 72.8 | 82.2 |
| | | 83.8 | | |
| Conversion at thermochemical equilibrium: | | | | |
| Conversion (%) | 77.1 | 82.7 | 82.7 | 87.2 |

The data in the table confirm that catalysis gives a significant improvement in conversion under all conditions studied, and that in two cases (at temperatures of 800° C. and 850° C., and residence times of 16.5 and 16.6 seconds, respectively) the residence time was sufficient for the gas to reach equilibrium conversion within experimental error.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

What is claimed is:

1. A method for treating a gas mixture containing $H_2S$ and $CO_2$ to recover the $H_2S$ therein as elemental sulfur, said method comprising:
   (a) contacting said gas mixture with a transition metal sulfide catalyst which enhances the decomposition rate of $H_2S$ to hydrogen gas and elemental sulfur, at a temperature of at least about 700° C. to thereby accelerate said decomposition and to cause a reverse water-gas shift reaction between said $CO_2$ and the hydrogen gas thus produced, thereby producing a product mixture containing elemental sulfur;
   (b) quenching said product mixture by cooling said product mixture to a temperature of about 650° C. or less at a quench rate of at least about 100° C./second; and
   (c) condensing and recovering said elemental sulfur from said product mixture.

2. A method in accordance with claim 1 in which said transition metal sulfide catalyst is a member selected from the group consisting of sulfides of molybdenum, chromium, tungsten, and vanadium.

3. A method in accordance with claim 1 in which said transition metal sulfide catalyst is a member selected from the group consisting of $MoS_2$, $Cr_2S_3$, $WS_2$, and $V_2S_3$.

4. A method in accordance with claim 1 in which said transition metal sulfide catalyst is $MoS_2$.

5. A method in accordance with claim 1 further comprising adjusting the amount of $CO_2$ present in said gas mixture prior to step (a) to achieve a $H_2S:CO_2$ mole ratio of from about 0.25:1 to about 4:1.

6. A method in accordance with claim 1 further comprising adjusting the amount of $CO_2$ present in said gas mixture prior to step (a) to achieve a $H_2S:CO_2$ mole ratio of from about 1.5:1 to about 4:1.

7. A method in accordance with claim 1 in which said temperature of step (a) is from about 800° C. to about 1,000° C., and said quench rate of step (b) is at least about 1000° C./second.

8. A method in accordance with claim 1 in which said gas mixture is defined as a concentrated gas mixture, and said method further comprises forming said concentrated gas mixture from a crude gas mixture containing $H_2S$ and $CO_2$ by:
   (i) contacting said crude gas mixture with a solvent to dissolve substantially all of said $H_2S$ and at least a portion of said $CO_2$ in said solvent; and
   (ii) stripping $H_2S$ and $CO_2$ from said solvent to form said concentrated gas mixture;
steps (i) and (ii) occurring prior to step (a).

9. A method in accordance with claim 8 in which said crude mixture contains a molar excess of $CO_2$ relative to $H_2S$, and said solvent is an aqueous solution in which the rate at which $H_2S$ dissolves is greater than the rate at which $CO_2$ dissolves.

10. A method in accordance with claim 9 in which said aqueous solution is an aqueous solution of a member selected from the group consisting of alkanolamines, dialkanolamines, and alkali metal carbonates.

11. A method in accordance with claim 9 in which said aqueous solution is an aqueous solution of a member selected from the group consisting of ($C_1$-$C_4$ alkanol)-amines, di-($C_1$-$C_4$ alkanol)-amines, and potassium carbonate.

12. A method in accordance with claim 8 further comprising adding to said concentrated gas mixture sufficient $CO_2$ to achieve a $H_2S:CO_2$ mole ratio of from about 0.25:1 to about 4:1.

13. A method in accordance with claim 8 further comprising adding to said concentrated gas mixture sufficient $CO_2$ to achieve a $H_2S:CO_2$ mole ratio of from about 1:1 to about 4:1.

14. A method in accordance with claim 1 in which step (c) produces a residual gas mixture containing at least one reaction by-product including COS, said method further comprising:
   (d) hydrolyzing said COS to $CO_2$ and $H_2S$;
   (e) recovering said $CO_2$ and $H_2S$ from said residual gas mixture; and
   (f) recycling said recovered $CO_2$ and $H_2S$ to step (a).

15. A method in accordance with claim 14 in which step (d) comprises contacting said residual gas mixture with an aqueous solution of potassium carbonate.

16. A method in accordance with claim 14 in which step (d) comprises contacting said residual gas mixture with an aqueous solution of from about 10% to about 30% by weight potassium carbonate at a temperature of from about 50° C. to about 90° C.

17. A method in accordance with claim 1 in which step (c) produces a residual gas mixture containing as by-products COS and $SO_2$, said method further comprising:
   (d) contacting said residual gas mixture with an aqueous solution to hydrolyze said COS to $CO_2$ and $H_2S$, and to absorb said $SO_2$ into said aqueous solution, leaving said $CO_2$ and said $H_2S$ in said residual gas mixture;
   (e) recovering said $CO_2$ and $H_2S$ from said residual gas mixture; and
   (f) recycling said recovered $CO_2$ and $H_2S$ to step (a).

18. A method in accordance with claim 17 in which said aqueous solution is an aqueous solution of potassium carbonate at a concentration of from about 10% to about 30% by weight, and step (d) is conducted at a temperature of from about 50° C. to about 90° C.

19. A method for treating a gas mixture containing $H_2S$ and $CO_2$ to recover the $H_2S$ therein as elemental sulfur, said method comprising:
   (a) contacting said gas mixture with an aqueous solution of a member selected from the group consisting of ($C_1$-$C_4$ alkanol)-amines, di-($C_1$-$C_4$ alkanol)-amines, and potassium carbonate to dissolve substantially all of said $H_2S$ and at least a portion of said $CO_2$;
   (b) separating said aqueous solution from said gas mixture and stripping $H_2S$ and $CO_2$ from said aqueous solution to form a $H_2S$-enriched gas mixture;
   (c) cooling said $H_2S$-enriched gas mixture to remove by condensation at least a majority of any water vapor contained therein, thereby forming a further $H_2S$-enriched gas mixture;
   (d) adding to said further $H_2S$-enriched gas mixture sufficient $CO_2$ to achieve a $H_2S$:$CO_2$ mole ratio therein of from about 0.25:1 to about 4:1;
   (e) contacting said further $H_2S$-enriched gas mixture with a catalyst selected from the group consisting of $MoS_2$, $Cr_2O_3$ and $WS_2$ at a temperature of from about 800° C. to about 1,000° C. to thereby accelerate said decomposition and to cause a reverse water-gas shift reaction between said $CO_2$ and the hydrogen gas thus produced, thereby producing a product mixture containing elemental sulfur;
   (f) quenching said product mixture by cooling said product mixture to a temperature of about 600° C. or less at a quench rate of at least about 100° C./second;
   (g) condensing and recovering said elemental sulfur from said product mixture, leaving a residual gas mixture containing CO and $H_2$ and, as by-products, at least one member selected from the group consisting of COS and $SO_2$;
   (h) contacting said residual gas mixture with an aqueous potassium carbonate solution at a temperature of from about 50° C. to about 90° C. to hydrolyze any COS present in said gas mixture to $CO_2$ and $H_2S$, and to absorb any $SO_2$ present in said gas mixture into said aqueous solution, leaving said $CO_2$ and said $H_2S$ in said residual gas mixture;
   (i) separating said residual gas mixture from said aqueous solution and recovering said $CO_2$ and $H_2S$ from said residual gas mixture; and
   (j) recycling said recovered $CO_2$ and $H_2S$ to step (a).

* * * * *